United States Patent Office 3,518,071
Patented June 30, 1970

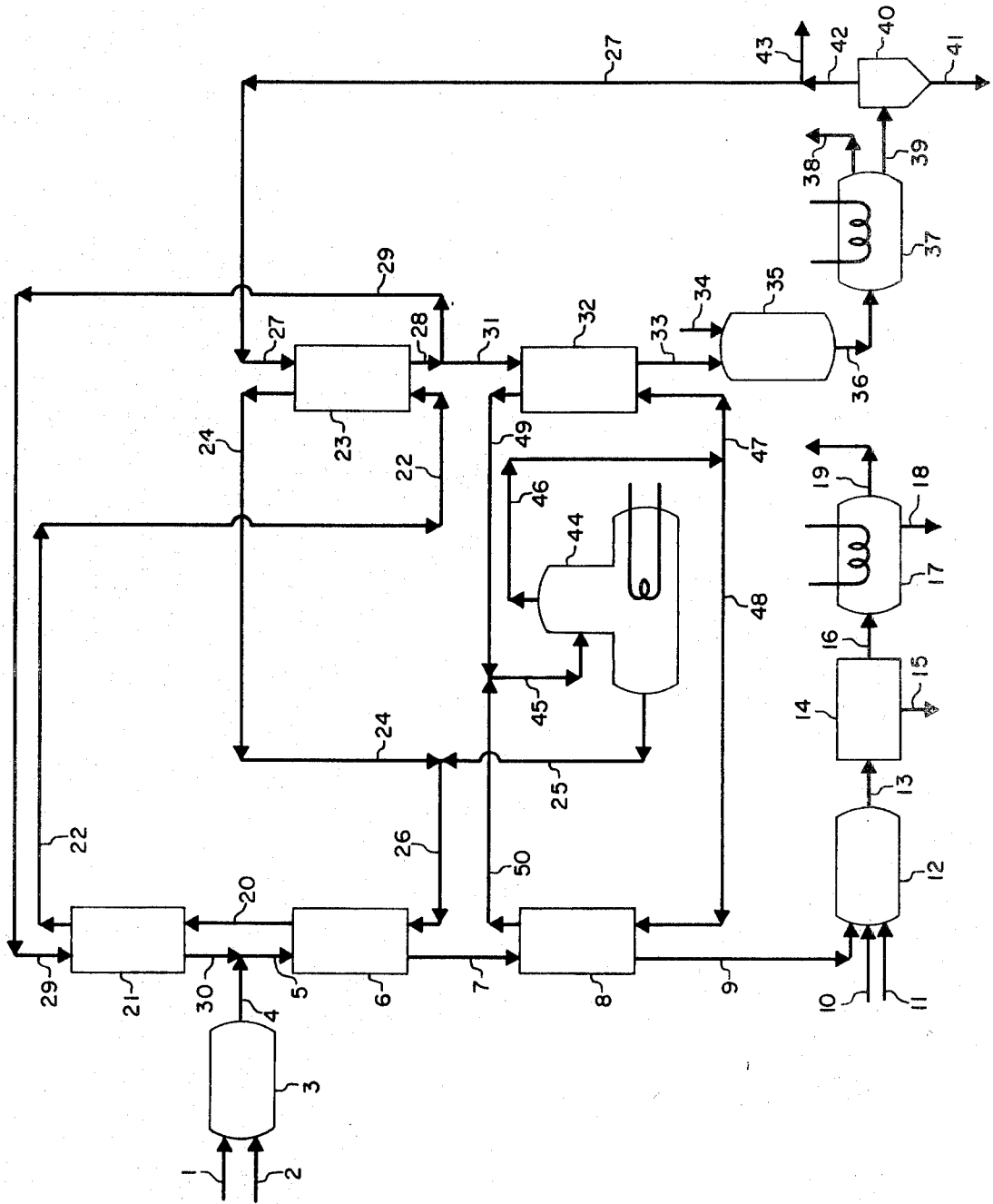

3,518,071
PRODUCTION OF NITROPHOSPHATE FERTILIZER AND AMMONIUM NITRATE-CALCIUM CARBONATE FERTILIZERS
John F. Villiers-Fisher, Kendall Park, and Anthony J. Andreatch, New Brunswick, N.J., assignors to Chemical Construction Corporation, New York, N.Y., a corporation of Delaware
Filed Jan. 23, 1967, Ser. No. 610,954
Int. Cl. C05b *11/06;* C05c *1/00*
U.S. Cl. 71—35                            3 Claims

ABSTRACT OF THE DISCLOSURE

Phosphate rock is digested with aqueous nitric acid, to produce an aqueous solution containing calcium nitrate, phosphoric acid and nitric acid. The aqueous solution is extracted with a suitable organic solvent such as amyl alcohol, to yield an aqueous phase rich in calcium nitrate and an organic solvent phase rich in phosphoric acid and nitric acid. The organic solvent phase is extracted with a concentrated or saturated aqueous solution containing dissolved ammonium nitrate and ammonium phosphate, which removes phosphoric acid and nitric acid into the aqueous phase. A portion of the resultant aqueous phase may be recycled counter-current to the organic solvent phase containing the acids for removal of residual calcium nitrate contained therein. The resulting organic solvent phase of depleted phosphoric acid and nitric acid content is recycled for further extraction. The aqueous solution, now containing phosphoric and nitric acids as well as ammonium phosphate and ammonium nitrate, is reacted with ammonia, to form an aqueous solution containing only ammonium phosphate and ammonium nitrate and, depending on process conditions, solid ammonium phosphate. This solution is evaporated, to form a slurry of solid crystals of ammonium phosphate or of mixed ammonium nitrate and ammonium phosphate, depending on process conditions, in a saturated solution. The concentrated solution is separated from the solid crystals, which comprise product nitrophosphate fertilizer, and at least a portion of the concentrated solution is recycled for further extraction of organic solvent laden with phosphoric acid and nitric acid. The aqueous solution such as the aqueous solution containing the nitric and phosphoric acids, ammonium nitrate and ammonium phosphate, or the aqueous solution phase rich in calcium nitrate, may be initially extracted with a water-immiscible organic solvent such as benzene to remove residual primary organic solvent such as amyl alcohol. The final aqueous calcium nitrate solution is treated with ammonia and carbon dioxide to produce a fertilizer product consisting of ammonium nitrate containing calcium carbonate.

BACKGROUND OF THE INVENTION

Field of the invention

The invention relates to the digestion of phosphate rock with nitric acid, to form a useful nitrophosphate fertilizer product, which is a mixture of ammonium nitrate and ammonium phosphate. Organic solvent extraction is provided for separating phosphoric and nitric acids from calcium nitrate in the digester effluent, and the acids are recovered from the organic solvent by extraction with a concentrated aqueous solution of ammonium nitrate-phosphate. The aqueous solution is then ammoniated to form further ammonium phosphate and ammonium nitrate in solution, and the aqueous solution is evaporated to provide solid crystals of product nitrophosphate fertilizer. The residual concentrated solution is then utilized for further extraction of the acids-laden organic solvent.

Description of the prior art

Numerous patents and other disclosures pertain to the solvent extraction of phosphoric acid values from the digester effluent produced by the digestion of phosphate rock with sulfuric acid, which is the conventional acid employed in commercial facilities. In such installations, the digester effluent contains relatively insoluble calcium sulfate, which simplifies the separate recovery of liquid phosphoric acid by solvent extraction employing various solvents, such as those suggested in U.S. Pats. Nos. 1,462,-840; 1,499,611; 1,838,431; 1,857,470; 1,929,441; 1,929,-442; 1,929,443; 1,968,544; 2,493,915; 2,880,063; 2,885,-265; 2,885,266; 2,899,292; 2,914,380; 2,955,918; 3,072,-461; 3,118,730; British Pats. Nos. 805,517; 953,156; 953,378 and Canadian Pats. Nos. 575,861 and 685,010. In addition, U.S. Pat. No. 3,245,777 provides a nitric acid digestion procedure in which a mixture of monobasic calcium phosphate and calcium nitrate is extracted with a lower alcohol or ketone to selectively remove calcium nitrate. Other similar patents include U.S. 2,849,280; 2,882,123; and 2,859,092 and British Pat. No. 1,049,197.

SUMMARY OF THE INVENTION

In the present invention, phosphate rock is digested with aqueous nitric acid, and the resulting aqueous solution containing dissolved calcium nitrate, phosphoric acid and excess nitric acid values is extracted with a selective organic solvent such as amyl alcohol, to remove phosphoric acid and nitric acid into the organic phase while leaving calcium nitrate in the aqueous phase. The organic phase is then separately extracted with a concentrated or saturated aqueous solution of ammonium nitrate and ammonium phosphate, so that an aqueous solution containing dissolved phosphoric acid and nitric acid as well as ammonium nitrate and ammonium phosphate is produced. The regenerated organic phase is recycled for further extraction, while the aqueous solution is ammoniated to produce a solution containing only ammonium phosphate and ammonium nitrate. This solution is evaporated to form solid crystals of ammonium phosphate-nitrate, which are separated from residual concentrated solution. The solid crystals consist of a solid nitrophosphate fertilizer product, while the concentrated solution is totally or partially recycled to extract further acids-laden organic solvent.

The principal novel feature of the invention is the use of the concentrated or saturated solution from the nitrophosphate crystallizer to extract phosphoric and nitric acid values from the organic solvent. This feature is highly advantageous, in avoiding a dilute aqueous process stream at this step. The use of water per se for extracting phosphoric and nitric acid values from the organic solvent would result in excessive dilution of the ammonium phosphate-nitrate solution formed on ammoniation, and thus would lead to excessive steam consumption during concentration and crystallization. In addition, in most instances the organic solvent is somewhat soluble in aqueous solutions and must be separately recovered by additional processing. It has been determined that the use of a concentrated or saturated ammonium phosphate-nitrate solution for extraction of acid values from the organic solvent results in a reduction in the amount of expensive solvent which is dissolved in the aqueous phase and must be subsequently recovered. In summary, the invention is highly advantageous in reducing the steam or other utilities costs during production of ammonium phosphate-nitrate fertilizer by nitric acid digestion of phosphate rock. Another advantage is that there is a reduction of solvent losses during production of amonium phosphate-nitrate fertilizer by a solvent extraction process. Another advantage is that nitrophosphate fertilizer, or a mixture of ammonium phosphate and ammonium nitrate, is produced in a more efficient and economical manner. A further advantage is that calcium nitrate is completely separated from phosphoric and nitric acids in the digester effluent by solvent extraction.

As mentioned supra, in most instances a minor portion of the organic solvent will remain in the aqueous calcium nitrate solution and also in the aqueous ammonium nitrate-phosphate extraction solution after absorption of phosphoric acid and nitric acid by extraction from the rich organic solvent solution. Depending on the proportion and cost of the solvent, this loss may be tolerated in some instances. However, in most cases the dissolved primary organic solvent must be recovered from the aqueous solutions. This is accomplished by extracting the aqueous solutions with a water-immiscible organic solvent such as benzene. The water-immiscible organic solvent containing dissolved primary organic solvent may be regenerated by a variety of procedures, such as by distillation or extraction of primary organic solvent with water or aqueous solutions.

It is an object of the present invention to provide an improved solvent extraction process for the production of nitrophosphate fertilizer from the effluent solution produced by digestion of phosphate rock with nitric acid.

Another object is to produce useful fertilizer products by the digestion of phosphate rock with nitric acid.

A further object is to provide a solvent extraction process for the treatment of the digester effluent solution produced by digestion of phosphate rock with nitric acid, so as to separate calcium nitrate from phosphoric acid.

An additional object is to recover phosphoric acid and nitric acid values in an improved manner, from an organic solvent employed to extract these values from the digester effluent solution produced by digestion of phosphate rock with nitric acid.

Still another object is to reduce utilities requirement and solvent losses in a process for the production of a mixture of ammonium nitrate and ammonium phosphate by solvent extraction of the digester effluent solution produced by digestion of phosphate rock with nitric acid.

These and other objects and advantages of the present invention will become evident from the description which follows.

DESCRIPTION OF THE DRAWING AND PREFERRED EMBODIMENTS

Referring to the figure, a flowsheet showing preferred embodiments of the invention is presented. The flowsheet will be described with respect to the use of isoamyl alcohol as a preferred primary organic solvent for the extraction of phosphoric acid and nitric acid, however other organic solvents such as n-amyl alcohol, isobutyl alcohol, cyclohexanol, normal butyl alcohol, methyl cyclohexanol and 2-pentanone also provide effective extraction. In addition, methyl isobutyl ketone, normal butyl phosphate, butyl acetamide, isopropyl ether, tertiary amyl alcohol, 3-pentanone, 2-heptanone, 3-heptanone and methyl ethyl ketone provide satisfactory results as primary phosphoric acid solvents. The preferable water-immiscible secondary solvent employed in the present invention to recover amyl alcohol or other primary organic solvent from aqueous solutions is benzene, however effective results are also attained with petroleum ether or other water-immiscible organic solvents which selectively extract the primary solvent such as amyl alcohol from aqueous solution.

Referring now to the figure, the phosphate rock stream 1 and aqueous nitric acid stream 2 are reacted in digester 3, to produce an aqueous solution containing calcium nitrate, phosphoric acid, residual nitric acid, and a small amount of residual solid sludge. The solid sludge may be removed by means not shown, such as by the addition of a flocculating agent followed by thickening and/or filtration.

In any case, a clear aqueous solution stream 4 is produced, which contains calcium nitrate, phosphoric acid and nitric acid. Stream 4 is combined with recycle aqueous solution stream 30 derived in a manner to be described infra. The resulting combined aqueous stream 5 now passes to extractor 6, which is a countercurrent liquid-liquid contact extractor. It will be understood that in the process description and claims infra, reference to an extractor or an extraction step refers to countercurrent liquid-liquid contact extraction.

The aqueous stream 5 is contacted with isoamyl alcohol in unit 6. As mentioned supra, other suitable organic solvents may be employed instead of amyl alcohol, or a mixture of solvents may be employed as the primary organic solvent. The resulting aqueous solution stream 7 contains essentially only calcium nitrate, together with a minor proportion of dissolved amyl alcohol. Stream 7 passes to extractor 8 for contact with benzene or other water-immiscible organic solvent, which removes the amyl alcohol into an organic liquid phase. The resulting aqueous calcium nitrate solution stream 9 is now processed by suitable procedures in order to produce a useful nitrate fertilizer product such a nitrochalk or ammonium nitrate. One typical procedure for treating stream 9 so as to poduce ammonium nitrate will now be described. Stream 9 is reacted with ammonia stream 10 and carbon dioxide stream 11 in reactor 12 at a pH above 5.0, to produce ammonium nitrate in solution and percipitate solid calcium carbonate. The resulting slurry stream 13 is filtered in filter 14, and by-product solid calcium carbonate stream 15 is passed to waste disposal. The clear ammonium nitrate solution stream 16 is now directly usable as a fertilizer product, however stream 16 will usually be concentrated in evaporator 17 to produce ammonium nitrate melt or crystals stream 18, with discharge of water vapor via 19. In instances when nitrochalk rather than ammonium nitrate per se is the desired fertilizer product, the filtration procedure of unit 14 may be omitted, and stream 18 will consist of solid nitrochalk fertilizer.

Returning to the initial extractor 6, the discharged amyl alcohol solution stream 20 contains dissolved phosphoric acid and nitric acid values, together with a minor amount of calcium nitrate. Stream 20 passes initially through extractor 21, for removal of calcium nitrate by contact with a small aqueous stream of recycle liquor having high initial phosphoric acid and nitric acid content. The resulting amyl alcohol solution stream 22, now having negligible calcium nitrate content but rich in phosphoric acid and nitric acid values, is passed through extractor 23 for contact with a concentrated or saturated aqueous solution of ammonium phosphate and ammonium nitrate, which removes most of the phosphoric acid and some of the nitric acid from the amyl alcohol phase. The resulting amyl alcohol stream 24 is recycled to extractor 6, together with recovered amyl alcohol stream 25, via stream 26.

Returning to extractor 23, the concentrated or saturated aqueous solution of ammonium phosphate and ammonium nitrate stream 27 is derived from within the process in a manner to be described infra. Stream 27 passes in contact with the amyl alcohol solution and absorbs phosphoric and nitric acid, together with a small proportion of amyl alcohol. The resulting aqueous stream 28 is divided, with a minor proportion passing via stream 29 to extractor 21 in order to recover calcium nitrate from amyl alcohol solution, with the resulting aqueous stream 30 being combined with stream 4 to form stream 5. The balance of stream 28 passes via stream 31 to extractor 32, which is similar in function to extractor 8, in that amyl alcohol is removed from the aqueous phase by contact with benzene. The resulting aqueous phase stream 33 now contains dissolved phosphoric acid, nitric acid, ammonium phosphate and ammonium nitrate, and is processed to produce solid nitrophosphate fertilizer product and aqueous recycle solution stream 27. Stream 33 is reacted with ammonia stream 34 in reactor 35, to form a mixture of ammonium phosphate and ammonium nitrate in solution. The resulting stream 36 is passed to evaporator 37, for the production of a granular crystalline mixture or slurry of ammonium phosphate and ammonium nitrate, known as nitrophosphate fertilizer. Water vapor is discharged from unit 37 via stream 38, and the resulting slurry stream 39 is passed to solids-liquid separator 40, which is a cyclonic or baffled vessel of conventional design for the separation of solids and liquid phases. A conventional form of filter may also be employed instead of unit 40. Solids stream 41 discharged from unit 40 consists of product nitrophosphate fertilizer, or a mixture of ammonium phosphate and ammonium nitrate crystals. The residual liquid phase stream 42 discharged from unit 40 consists of a concentrated or saturated solution of ammonium phosphate and ammonium nitrate. Stream 42 is usually divided to form streams 27 and 43. Stream 27 is recycled as described supra, while stream 43 is a coproduct of the process and is a valuable liquid nitrophosphate fertilizer. In some instances, stream 43 may be omitted, and all of stream 42 may be recycled via stream 27.

A typical benzene processing sequence is also shown in the flow-sheet. Central still 44 separates mixed benzene-amyl alcohol stream 45 into separate benzene and amyl alcohol components by distillation. The separated amyl alcohol component passes from still 44 via stream 25 to the amyl alcohol circuit as recovered amyl alcohol. The benzene component passes from still 44 via stream 46, which is divided into streams 47 and 48. The individual benzene streams 47 and 48 serve for extraction of amyl alcohol from aqueous solutions, and pass to extractors 32 and 8 respectively. Benzene streams 49 and 50 containing disolved amyl alcohol are recovered from extractors 32 and 8 respectively. Streams 49 and 50 are combined in form stream 45.

Numerous alternatives within the scope of the present invention, besides those mentioned supra, will occur to those skilled in the art. Operating ranges or suitable magnitudes of process variables such as temperature and solution concentrations employed in practice of the invention will depend on specific solvents to be employed and may be readily selected by those skilled in the art to produce optimum results. In general, the digestion steps will be carried out preferably at a temperature in the range between 0° C. to 60° C., and preferably at ambient or lower temperatures, using nitric acid concentrations between 10% and 40% and preferably about 30% by weight. A slight excess of nitric acid is preferable during digestion, on the order of about 7%, over the stoichiometric requirement. Thus, the nitrate to phosphorus pentoxide molar ratio in solvent stream 22 will generally be in the range of about 1.3 to 1, to 1.8 to 1. In addition, the acid nitrate to acid phosphorus pentoxide molar ratio in stream 28 will be on the order of about 1:2. The weight ratios of the solvent to aqueous phase process streams in the primary extraction steps in units 6 and 23 were maintained at about 3:1, while the weight ratio of benzene to aqueous solution in units 8 and 32 was about 1:10. Streams 41 and 27 have been indicated as containing ammonium phosphate. It will be apparent to those skilled in the art that streams 41 and 27 may contain either monoammonium phosphate, diammonium phosphate, triammonium phosphate or a mixture of these individual phosphates, depending on the proportion of ammonia added via stream 34.

Some of the primary organic solvents which may be employed for the removal of phosphoric acid and nitric acid from stream 5 in unit 6 may be relatively insoluble in water. In this instance, the auxiliary water-immiscible benzene solvent circuit may not be required, and units 8, 32 and 44 may be omitted, together with their associated benzene streams. Similarly, some of the primary organic solvents which may be employed for the removal of phosphoric acid and nitric acid from stream 5 in unit 6 may have a negligible capacity for dissolving calcium ions, in which case stream 20 will have a negligible content of calcium nitrate, and unit 21 and streams 22 and 29 may be omitted, with stream 20 passing directly to unit 23. In other instances, unit 21 and its function may be retained, with fresh water instead of stream 29 being passed to unit 21. In this case, stream 29 would be omitted, and all of stream 28 would pass to further processing via stream 31. Stream 9 may be provided by other means known to the art, in order to recover nitrate values in usable form. The reaction between streams 33 and 34 in unit 35 may result in the precipitation of ammonium nitrate or ammonium phosphate or both of these salts. In this case, stream 36 would consist of a dilute slurry. In other instances, substantial precipitation may occur in unit 35, in which case unit 37 and its function may be omitted. Finally, in some instances, depending on relative concentrations of phosphate and nitrate in the system, it is possible to produce a relatively pure solid ammonium phosphate product via stream 41, without substantial co-precipitation of ammonium nitrate. In this case, the ammonium nitrate may be recovered as a relatively pure co-product by adding stream 43 to stream 5, so that residual phosphate is removed via stream 20. The ammonium nitrate will then pass in solution via streams 7, 9, 13 and 16, and will be recovered as a component of stream 18.

An example of industrial application of the process of the present invention will now be described.

EXAMPLE

Ground phosphate rock is digested with aqueous nitric acid of 60% concentration by weight. A mole ratio of nitric acid to calcium oxide of 2.5:1 is maintained in the digester, and the digester effluent stream is initially processed by thickening with a flocculating agent. The clear overflow is passed to solvent extraction as stream 4. Following are the compositions of process streams relating to unit 23, expressed on an analysis basis in terms of equivalent mass as analyzed. For example, phosphoric acid and/or ammonium phosphate content is expressed in terms of equivalent phosphorus pentoxide mass which would be present if all of the phosphorus in the acid or ammonium phosphate was converted to phosphorus pentoxide. The following data illustrates the effectiveness of employing saturated ammonium phosphate-nitrate stream 27 to extract nitric and phosphoric acid values from the rich amyl alcohol solvent stream 22.

| Stream No. | Stream analysis, grams/100 ml. | | |
| --- | --- | --- | --- |
| | Phosphorus pentoxide | Total nitrate | Calcium |
| 22 | 2.95 | 12.3 | 0.05 |
| 24 | 1.5 | 10.55 | 0.027 |
| 27 | 1.26 | 52.2 | |
| 28 | 9.48 | 62.4 | 0.14 |

What is claimed is:
1. A process for the production of nitrophosphate fertilizer and an ammonium nitrate-containing product which comprises
 (a) digesting phosphate rock with aqueous nitric acid to produce a first aqueous solution containing dissolved calcium nitrate, phosphoric acid and nitric acid,
 (b) countercurrently extracting said first aqueous solution with an organic solvent selected from the group consisting of isoamyl alcohol, n-amyl alcohol, isobutyl alcohol, cyclohexanol, normal butyl alcohol, methyl cyclohexanol, 2-pentanone, methyl isobutyl ketone, normal butyl phosphate, butyl acetamide, isopropyl ether, tertiary amyl alcohol, 3-pentanone, 2-heptanone, 3-heptanone and methyl ethyl ketone, whereby an organic phase containing dissolved phosphoric acid and nitric acid is produced, and residual first aqueous solution containing dissolved calcium nitrate is produced, (c) countercurrently extracting said organic phase with a second aqueous solution recycled from step (h) of this process, said solution being saturated with ammonium nitrate and ammonium phosphate, whereby phosphoric acid and nitric acid are dissolved into the second aqueous solution, (d) recycling the resulting organic solvent of depleted phosphoric acid and nitric acid content to step (b) for further extraction of first aqueous solution, (e) reacting said second aqueous solution produced by step (c) and containing disolved ammonium nitrate, ammonium phosphate, phosphoric acid and nitric acid with ammonia, to form a third aqueous solution containing ammonium phosphate and ammonium nitrate, (f) evaporating said third aqueous solution to form a slurry of solid crystals comprising ammonium phosphate in a saturated aqueous solution of dissolved ammonium nitrate and ammonium phosphate, (g) separating said satuarted aqueous solution of step (f) containing dissolved ammonium nitrate and ammonium phosphate from said solid crystals comprising product nitrophosphate fertilizer, (h) recycling at least a portion of the separated saturated aqueous solution of step (g) containing dissolved ammonium nitrate and ammonium phosphate to step (c) as said second aqueous solution, and (i) processing said residual first aqueous solution of step (b) containing calcium nitrate to produce a solid ammonium nitrate-containing product, by reacting said residual aqueous calcium nitrate solution with ammonium and carbon dioxide at a pH above 5, to form ammonium nitrate in aqueous solution and precipitate solid calcium carbonate, and evaporating water from the resulting solution to form a solid nitrate product containing nitrate as ammonium nitrate and calcium carbonate.

2. A process for the production of nitrophosphate fertilizer and an ammonium nitrate-containing product which comprises (a) digesting phosphate rock with aqueous nitric acid to produce a first aqueous liquid solution containing dissolved calcium nitrate, phosphoric acid and nitric acid, (b) adding a second aqueous liquid solution recycled from step (g), said solution containing dissolved calcium nitrate, nitric acid, phosphoric acid, ammonium nitrate and ammonium phosphate, to said first aqueous solution to form a combined aqueous solution, (c) countercurrently extracting the combined aqueous solution of step (b) with an organic solvent selected from the group consisting of isoamyl alcohol, n-amyl alcohol, isobutyl alcohol, cyclohexanol, normal butyl alcohol, methyl cyclohexanol, 2-pentanone, methyl isobutyl ketone, normal butyl phosphate, butyl acetamide, isopropyl ether, tertiary amyl alcohol, 3-pentanone, 2-heptanone, 3-heptanone and methyl ethyl ketone, whereby an organic phase containing dissolved phosphoric acid, nitric acid, and a minor proportion of calcium nitrate is produced, and residual aqueous combined solution containing dissolved calcium nitrate is produced, (d) countercurrently extracting said organic phase with a portion of the aqueous solution obtained in step (e), said solution containing nitric acid, phosphoric acid, ammonium nitrate and ammonium phosphate, whereby substantially all of the calcium nitrate and a minor proportion of nitric acid and phosphoric acid are dissolved into said aqueous liquid, (e) countercurrently extracting the resulting organic phase from step (d), now substantially free of calcium nitrate, with a third aqueous liquid solution recycled from step (k), said solution being concentrated in ammonium nitrate and ammonium phosphate, whereby phosphoric acid and nitric acid are dissolved into the third aqueous solution, (f) recycling the resulting organic solvent of depleted phosphoric acid and nitric content for further extraction of combined aqueous solution according to step (c), (g) adding the resulting aqueous liquid from step (d) containing dissolved calcium nitrate to said first aqueous solution according to step (b) as said second aqueous liquid solution, (h) reacting said third aqueous solution from step (e) and containing dissolved ammonium nitrate, ammonium phosphate, phosphoric acid and nitric acid with ammonia, to form a fourth aqueous solution containing ammonium phosphate and ammonium nitrate, (i) evaporating said fourth aqueous solution to form a slurry of solid crystals of ammonium nitrate and ammonium phosphate in a concentrated aqueous solution of dissolved ammonium nitrate and ammonium phosphate, (j) separating said concentrated aqueous solution of step (i) from said solid crystals comprising product nitrophosphate fertilizer, (k) recycling at least a portion of the separated concentrated aqueous solution of step (j) containing dissolved ammonium nitrate and ammonium phosphate to step (e) as said third recycled aqueous solution, and (l) processing said residual aqueous combined solution containing dissolved calcium nitrate of step (c) to produce a solid ammonium nitrate-containing product, by reacting said residual aqueous calcium nitrate solution with ammonia and carbon dioxide at a pH above 5, to form ammonium nitrate in aqueous solution and precipitate solid calcium carbonate, and evaporating water from the resulting solution to form a solid nitrate product containing nitrate as ammonium nitrate.

3. A process for the production of nitrophosphate fertilizer and an ammonium nitrate-containing product which comprises (a) digesting phosphate rock with aqueous nitric acid, to produce a first aqueous solution containing calcium nitrate, phosphoric acid and nitric acid, (b) countercurrently extracting said first aqueous solution with a first organic solvent selected from the group consisting of isoamyl alcohol, n-amyl alcohol, isobutyl alcohol, cyclohexanol, normal butyl alcohol, methyl cyclohexanol, 2-pentanone, methyl isobutyl ketone, normal butyl phosphate, butyl acetamide, isopropyl ether, tertiary amyl alcohol, 3-pentanone, 2-heptanone, 3-heptanone and methyl ethyl ketone, whereby a first organic solvent phase containing dissolved phosphoric acid and nitric acid, and an aqueous phase containing calcium nitrate and a small proportion of dissolved first organic solvent are produced, (c) countercurrently extracting said aqueous phase of step (b) with a first stream of second organic solvent selected from the group consisting of benzene and petroleum ether, said second solvent being water-immiscible, whereby first organic solvent is removed from said aqueous phase into the second organic solvent phase, (d) countercurrently extracting the first organic solvent phase from step (b) with a second aqueous solution concentrated in ammonium nitrate and ammonium phosphate and recycled from step (k), whereby phosphoric acid, nitric acid and a small proportion of first organic solvent are dissolved into said second aqueous solution, (e) recycling the first organic solvent produced by step (d) and having depleted phosphoric acid and nitric acid content to step (b) for further extraction of first aqueous solution, (f) countercurrently extracting the second aqueous solution produced by step (d) and containing dissolved ammonium nitrate, ammonium phosphate, nitric acid, phosphoric acid and a small portion of first organic solvent with a second stream of said second organic solvent, whereby first organic solvent is removed from said second aqueous solution into the second stream of said second organic solvent, (g) combining the first and second streams of second organic solvent produced by steps (c) and (f) and containing dissolved first organic solvent, and distilling the combined solvent to remove first organic solvent for recycle step (b) and to regenerate second organic solvent for recycle to steps (c) and (f) as said first and second streams of second organic solvent, (h) reacting said second aqueous solution derived from step (f) and containing dissolved ammonium nitrate, ammonium phosphate, phosphoric acid and nitric acid with ammonia, to form a third aqueous solution containing ammonium phosphate and ammonium nitrate, (i) evaporating said third aqueous solution to form a slurry of solid crystals of ammonium nitrate and ammonium phosphate in a concentrated aqueous solution of dissolved ammonium nitrate and ammonium phosphate, (j) separating said concentrated aqueous solution of step (i) containing dissolved ammonium nitrate and ammonium phosphate from said solid crystals comprising product nitrophosphate fertilizer, (k) recycling at least a portion of the separated concentrated aqueous solution of step (j) containing dissolved ammonium nitrate and ammonium phosphate to step (d) as said second aqueous solution, and (l) processing the residual aqueous phase produced by step (c) and containing dissolved calcium nitrate to produce a solid ammonium nitrate-containing product, by reacting said residual aqueous phase with ammonia and carbon dioxide at a pH above 5, to form ammonium nitrate in aqueous solution and precipitate solid calcium carbonate, and evaporating water from the resulting solution to form a solid nitrate product containing nitrate as ammonium nitrate.

References Cited

UNITED STATES PATENTS

| 2,885,265 | 5/1959 | Cunningham. | |
|-----------|--------|-------------|---|
| 2,885,266 | 5/1959 | Vickery | 23—165 |
| 3,342,580 | 9/1967 | De Rooij | 71—39 |

SAMIH N. ZAHARNA, Primary Examiner

B. H. LEVENSON, Assistant Examiner

U.S. Cl. X.R.

23—66, 103, 107, 165; 71—34, 43, 59, 60